(12) United States Patent
Ohashi

(10) Patent No.: US 10,540,825 B2
(45) Date of Patent: Jan. 21, 2020

(54) IMAGE PROCESSING APPARATUS

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/093,252

(22) PCT Filed: Feb. 16, 2017

(86) PCT No.: PCT/JP2017/005741
§ 371 (c)(1),
(2) Date: Oct. 12, 2018

(87) PCT Pub. No.: WO2017/191702
PCT Pub. Date: Sep. 11, 2017

(65) Prior Publication Data
US 2019/0206142 A1    Jul. 4, 2019

(30) Foreign Application Priority Data

May 2, 2016 (JP) .................................. 2016-092560

(51) Int. Cl.
*G06T 19/20* (2011.01)
*A63F 13/25* (2014.01)
(Continued)

(52) U.S. Cl.
CPC .............. *G06T 19/20* (2013.01); *A63F 13/25* (2014.09); *A63F 13/52* (2014.09); *G06T 7/70* (2017.01);
(Continued)

(58) Field of Classification Search
CPC ..................................................... G06T 19/20
See application file for complete search history.

(56) References Cited

U.S. PATENT DOCUMENTS

2013/0328762 A1* 12/2013 McCulloch .......... G02B 27/017
345/156
2013/0328928 A1* 12/2013 Yamagishi ........... G02B 27/017
345/633
(Continued)

FOREIGN PATENT DOCUMENTS

EP          2434458 A2      3/2012
EP          2953098 A1     12/2015
(Continued)

OTHER PUBLICATIONS

International Search Report and Written Opinion dated Mar. 15, 2017, from International Application No. PCT/JP2017/005741, 9 sheets.
(Continued)

*Primary Examiner* — Jitesh Patel
(74) *Attorney, Agent, or Firm* — Katten Muchin Rosenman LLP

(57) ABSTRACT

Disclosed herein is an image processing apparatus connected with a display apparatus used by a user wearing the apparatus at a head portion thereof. The image processing apparatus acquires information on a reality space around the user, detects positions of objects in the reality space based on the acquired information on the reality space, and configures information on a virtual space by disposing a virtual body at a position in the virtual space corresponding to the detected position of each of the objects. The image processing apparatus further generates an image of the configured virtual space and outputs the generated image to the display apparatus.

10 Claims, 7 Drawing Sheets

(51) Int. Cl.
  *A63F 13/52* (2014.01)
  *G06T 7/70* (2017.01)
  *G06T 15/20* (2011.01)
(52) U.S. Cl.
  CPC ...... *G06T 15/20* (2013.01); *A63F 2300/8082* (2013.01); *G06T 2219/2004* (2013.01)

(56) References Cited

U.S. PATENT DOCUMENTS

2014/0132629 A1* 5/2014 Pandey .............. G02B 27/0172
                                                  345/633
2016/0078641 A1   3/2016 Aratani et al.

FOREIGN PATENT DOCUMENTS

| JP | 2011-229679 A | 11/2011 |
| JP | 2012-133471 A | 7/2012 |
| JP | 2012-155655 A | 8/2012 |
| JP | 2015125641 A | 7/2015 |
| JP | 2015-143976 A | 8/2015 |
| JP | 2016-58042 A | 4/2016 |
| JP | 5913709 B1 | 4/2016 |
| JP | 2017-068411 A | 4/2017 |
| WO | 2016/048658 A1 | 3/2016 |

OTHER PUBLICATIONS

Toshikazu Oshima et al., "RV-Border Guards: A Multi-player Mixed Reality Entertainment", Transactions of the Virtual Reality Society of Japan, Dec. 31, 1999 (Dec. 31, 1999), vol. 4, No. 4, pp. 699 to 705, ISSN 1344-011X.

International Preliminary Report on Patentability dated Nov. 6, 2018, from International Application No. PCT/JP2017/005741, 14 sheets.

Extended European Search Report including supplementary European search report and the European search opinion dated Nov. 14, 2019, from European Patent Application No. 17792635, 10 sheets.

* cited by examiner

| | | | | | | | | | |
|---|---|---|---|---|---|---|---|---|---|
| ⋮ | ⋮ | ⋮ | ⋮ | ⋮ | ⋮ | | | | |
| 0 | 0 | 0 | 0 | 0 | 0 | ... | | | |
| 0 | 0 | 0 | 0 | 0 | 0 | ... | | | |
| -1 | -1 | -1 | -1 | 0 | 0 | ... | | | |
| -1 | -1 | -1 | -1 | 1 | 0 | ... | | | |
| 1 | 1 | 1 | 1 | 1 | 0 | ... | | | |
| 1 | 1 | 1 | 1 | 1 | 0 | ... | | | |
| 1 | 1 | 1 | 1 | 1 | 0 | ... | | | |

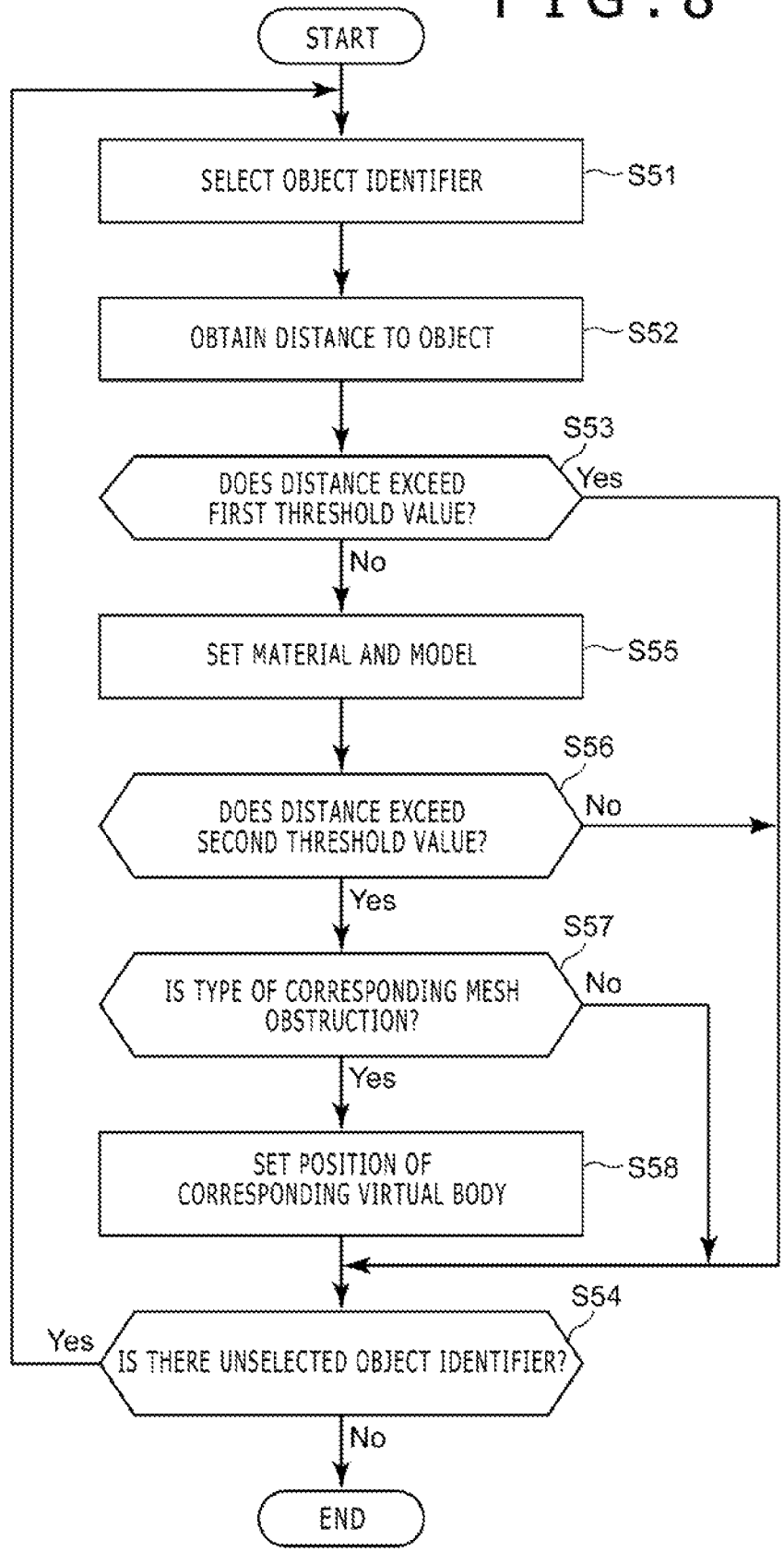

IMAGE PROCESSING APPARATUS

TECHNICAL FIELD

The present invention relates to an image processing apparatus connected with a display apparatus used by a user wearing the display apparatus at a head portion thereof.

BACKGROUND ART

Recently, display apparatuses used by a user wearing them at a head portion thereof, such as a head-mounted display, have been increasing. These display apparatuses form an image in front of a user's eyes, and thereby cause the user to view the image. As for these display apparatuses, there are a non-transmission type that covers a front portion of a user's eyes with a display unit and functions so as to prevent the user from viewing a reality space in front of the user's eyes; and a transmission type (optical see-through method) that has a display unit including a half mirror or the like and causes a user to view the reality space in front of the user's eyes.

For the non-transmission type of the display apparatus, for example, a displayed image can serve as an image in a virtual three-dimensional space generated by a game software.

Moreover, even as the non-transmission type of the display apparatus, there is an apparatus (referred to as a camera see-through method) simulatively realizing the transmission type of the display apparatus that displays a reality space, shot by a camera separately, in front of a user's eyes on a display unit and thereby causes the user to view the reality space in front of the user's eyes similar to the transmission type of the display apparatus.

SUMMARY

Technical Problem

Conventionally, in case of displaying an image of a virtual three-dimensional space (hereinafter, referred to as a virtual space), there is a problem such as an uncomfortable feeling occurring in a case where, although there is a body within user's reach in this virtual space, there is nothing at a corresponding position in the reality space, or in a case where, although there is nothing within user's reach in the virtual space, there is a body in the reality space and the user may touch the body.

The present invention has been made in view of the above circumstances, and one of the purposes is to provide an image processing apparatus that can reduce an uncomfortable feeling and display an image in the virtual space to a user.

Solution to Problem

According to the present invention that can solve the problem in the above conventional examples, there is provided an image processing apparatus connected with a display apparatus used by a user wearing the apparatus at a head portion thereof, the image processing apparatus including: information acquisition means for acquiring information on a reality space around the user; virtual space configuration means for detecting positions of objects in the reality space based on the acquired information on the reality space, and configuring information on a virtual space by disposing a virtual body at a position in the virtual space corresponding to the detected position of each of the objects; image generation means for generating an image of the virtual space configured by the virtual space configuration means; and output means for outputting the image generated by the image generation means to the display apparatus.

BRIEF DESCRIPTION OF DRAWINGS

FIG. 8 is a flowchart illustrating an operational example of the image processing apparatus according to the embodiment of the present invention.

DESCRIPTION OF EMBODIMENT

Figure 1:
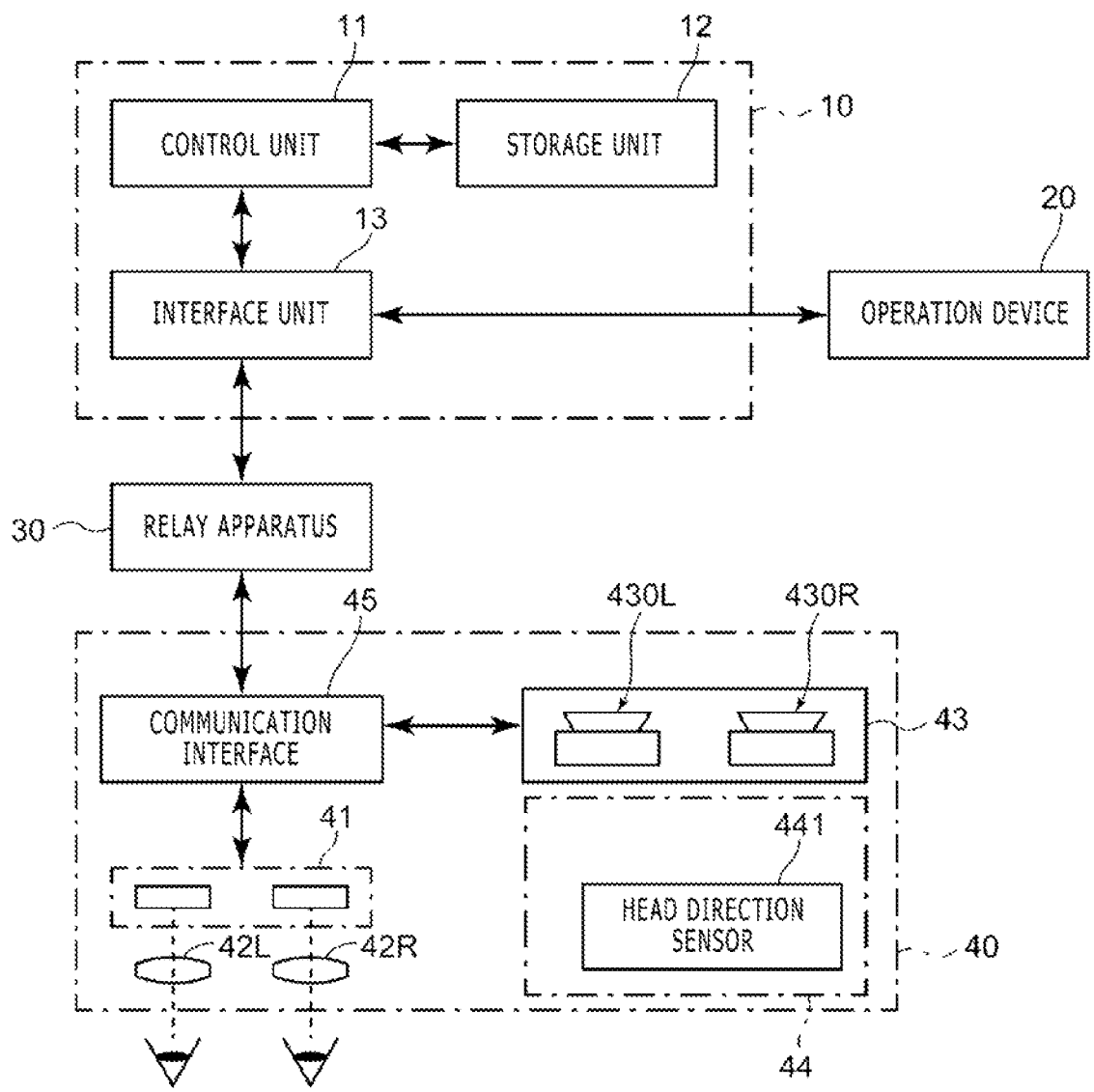
FIG. 1 is a constitutional block diagram illustrating an example of an image processing system including an image processing apparatus according to an embodiment of the present invention.

An embodiment of the present invention is described with reference to the drawings. As illustrated in FIG. 1, an image processing system 1, including an image processing apparatus 10 according to the embodiment of the present invention, includes the image processing apparatus 10, an operation device 20, a relay apparatus 30, and a display apparatus 40.

The image processing apparatus 10 is an apparatus supplying images to be displayed by the display apparatus 40. For example, the image processing apparatus 10 may be a home video game machine, a portable video game player, a personal computer, a smartphone, a tablet, or the like. As illustrated in FIG. 1, the image processing apparatus 10 includes a control unit 11, a storage unit 12, and an interface unit 13.

The control unit 11 is a program control device such as central processing unit (CPU), and executes a program stored in the storage unit 12. In the present embodiment, the control unit 11 acquires information about a reality space around a user wearing the display apparatus 40, detects a position of each object in the reality space based on the acquired information about the reality space, and configures information about a virtual space by disposing a virtual body (referred to as a virtual object) at a position in the virtual space corresponding to the position of each detected object.

Moreover, the control unit 11 generates images in a predetermined visual field from positions of rendering cameras (virtual cameras used in performing rendering in the virtual space) separately set in the configured virtual space, and outputs the generated images to the display apparatus 40. Regarding the positions of the rendering cameras, the control unit 11 may set two positions (one is a position corresponding to the left eye of the user, and the other is a position corresponding to the right eye thereof), may generate the images (the image for the left eye and the image for the right eye) of the virtual space in the visual fields from the respective positions, and may output the pair of generated images as a stereovision image to the display apparatus 40. In the following examples, the case is described where a stereovision image is generated.

In particular, in one example of the present embodiment, the control unit 11 sets a virtual three-dimensional space (virtual space) corresponding to the reality space (hereinafter, referred to as a target space) of a predetermined size around the user including a position of the user and a rear side of the user. For example, the predetermined size is a cuboid range with 10 m in width (a direction that is orthogonal to an eye direction of the user when the user wears the display apparatus 40 (i.e. initial period) and is parallel to a floor surface), 10 m in depth (the initial eye direction of the user that is parallel to the floor surface), and 3 m in height. The control unit 11 refers to the image of the reality space, and disposes the virtual object in this virtual space or applies a vision effect in the virtual space.

The storage unit 12 includes at least one memory device such as random access memory (RAM), and stores a program executed by the control unit 11. In addition, the storage unit 12 also operates as a work memory of the control unit 11, and stores data used by the control unit 11 in the course of executing a program. This program may be provided in the state of being stored in a computer readable and non-transitory record medium, and may be stored in the storage unit 12.

The interface unit 13 is an interface for data communication performed by the control unit 11 of the image processing apparatus 10 with the operation device 20 and relay apparatus 30. The image processing apparatus 10 is connected with the operation device 20, the relay apparatus 30, or the like, by either wireline or wireless, via the interface unit 13. As one example, the interface unit 13 may include a multimedia interface such as high-definition multimedia interface (HDMI; registered trademark) to send an image (a stereovision image) supplied by the image processing apparatus 10 and voice to the relay apparatus 30. Additionally, the interface unit 13 may include a data communication interface such as universal serial bus (USB) to receive various types of information from the display apparatus 40 and send a control signal and so on, via the relay apparatus 30. Moreover, the interface unit 13 may include a data communication interface such as USB to receive a signal representing information about an operation input of the user to the operation device 20.

The operation device 20 is, for example, a controller for a home video game machine. The operation device 20 is used to perform various types of instruction operations by the user to the image processing apparatus 10. The information about the operation input by the user to the operation device 20 is sent to the image processing apparatus 10, by either wireline or wireless. Note that the operation device 20 may not be necessarily separated from the image processing apparatus 10, and may include an operation button, a touch panel and so on that are disposed on a housing surface of the image processing apparatus 10. In one example of the present embodiment, the operation device 20 includes a "pause button" and the like for instructing a temporary stop of a game.

The relay apparatus 30 is connected with the display apparatus 40 by either wireline or wireless. The relay apparatus 30 receives stereovision image data supplied from the image processing apparatus 10, and outputs a vision signal according to the received data, to the display apparatus 40. At that time, the relay apparatus 30 may perform processing for correcting a distortion caused by optics of the display apparatus 40 and so on, on a vision represented by the supplied stereovision image, as necessary, and may output a vision signal representing the corrected vision. Note that the vision signal supplied from the relay apparatus 30 to the display apparatus 40 includes two vision signals of the vision signal for the left eye and the vision signal for the right eye that are generated based on the stereovision image. In addition, the relay apparatus 30 relays various types of information such as voice data and control signals that are sent and received between the image processing apparatus 10 and the display apparatus 40, other than stereovision images and vision signals.

The display apparatus 40 is a display device used by a user wearing the apparatus at a head portion thereof. The display apparatus 40 displays a vision according to a vision signal input from the relay apparatus 30 and allows the user to view the vision. In the present embodiment, the display apparatus 40 displays a vision corresponding to each eye, in front of corresponding one of the right eye and the left eye of the user. As illustrated in FIG. 1, the display apparatus 40 includes a vision display element 41, optical elements 42, a camera 43, a sensor unit 44, and a communication interface 45.

The vision display element 41 is an organic electroluminescence (EL) display panel, a liquid crystal display panel, or the like. The vision display element 41 displays a vision according to a vision signal supplied from the relay apparatus 30. The vision display element 41 may be one display element that displays visions for the left eye and the right eye to be arranged in a row, or may include a pair of display elements that independently display the visions for the left eye and the right eye. In addition, a display screen of a smartphone and so on may be used as it is as the vision display element 41. In this case, the smartphone and so on display the vision according to the vision signal supplied from the relay apparatus 30.

In addition, the display apparatus 40 may be a retinal irradiation type (retinal projection type) of apparatus that directly projects a vision on a retina of the user. In this case, the vision display element 41 may include a laser that emits light, a micro electro mechanical systems (MEMS) mirror that scans the light, and so on.

The optical elements 42 are hologram, a prism, a half mirror, or the like, and are disposed in front of the eyes of the user. The optical elements 42 transmits or refracts light of a vision displayed by the vision display element 41 and enter the light into the eyes of the user. In particular, the optical elements 42 may include an optical element 42L for the left eye and an optical element 42R for the right eye. In this case, the vision for the left eye displayed by the vision display element 41 may enter the left eye of the user via the optical element 42L for the left eye. The vision for the right eye may enter the right eye of the user via the optical element 42R for the right eye. Thereby, with the display apparatus 40 worn at the head portion, for example, the user can see, by the left eye, the vision for the left eye based on the image for the left eye, and can see, by the right eye, the vision for the right eye based on the image for the right eye, these visions for the left eye and the right eye being generated by the image processing apparatus 10. Note that in the present embodiment, the display apparatus 40 is a non-transmission type of display apparatus with which the user cannot view the state of the outside world.

Herein, an image generated by the image processing apparatus 10 is a stereovision image. However, if the image processing apparatus 10 outputs only one piece of image information, the vision for the left eye and the vision for the right eye may be generated at the relay apparatus 30 based on the image information. In this case, the vision for the left eye and the vision for the right eye are the same. That is, in this case, the display apparatus 40 displays the same visions on the left and right optical elements 42.

The camera 43 includes a pair of imaging elements 430L and 430R (referred to collectively as imaging elements 430, in the following descriptions, when the difference between the left and the right is not required), the imaging element 430L being disposed on a little left side with respect to a center portion of a front surface (an eye direction side of the user) of the display apparatus 40, the imaging element 430R being disposed on a little right side with respect to the center portion. The camera 43 captures an image of the reality space on the eye direction side of the user, which is captured by each imaging element 430, and outputs the image data obtained by the capturing, via the relay apparatus 30, to the image processing apparatus 10.

As one example, the sensor unit 44 may include a head direction sensor 441 that detects the direction of the head portion of the user (the front direction of the face of the user) wearing the display apparatus 40 and the position of the head portion of the user.

The head direction sensor 441 detects the direction of the head portion (the direction of the face) of the user. In particular, the head direction sensor 441 is a gyro or the like. The head direction sensor 441 detects and outputs a rotation angle in the head direction within a plane parallel to the floor surface, a rotation angle in an elevation angle direction, and a rotation angle around an axis in a visual field direction with respect to the initial direction when the user wears the display apparatus 40. In addition, with a predetermined position of the display apparatus 40 (for example, a position of the point that bisects a line segment connecting the imaging element 430L and the imaging element 430R of the camera 43) being set as a reference position, the head direction sensor 441 detects and outputs movement amount (x, y, z) at this reference position from the position at the time when the user wears the display apparatus 40, in a left-and-right direction of the user (an axis where a transverse plane and a coronal plane intersect each other; hereinafter, referred to as an X axis), a front-back direction thereof (an axis where a sagittal plane and the transverse plane intersect each other; hereinafter, referred to as a Y axis), and an upper and lower direction thereof (referred to as a Z axis). Note that herein, the XYS coordinate system is referred to as a user coordinate system. Relative coordinates of each imaging element 430 with this reference position set as the original point are known.

The communication interface 45 is an interface for performing communication of data such as a vision signal and image data between the communication interface 45 and the relay apparatus 30. For example, if the display apparatus 40 receives and sends data by a wireless communication such as wireless local area network (LAN) and Bluetooth (registered trademark) between the display apparatus 40 and the relay apparatus 30, the communication interface 45 includes an antenna for communication and a communication module.

Figure 2:
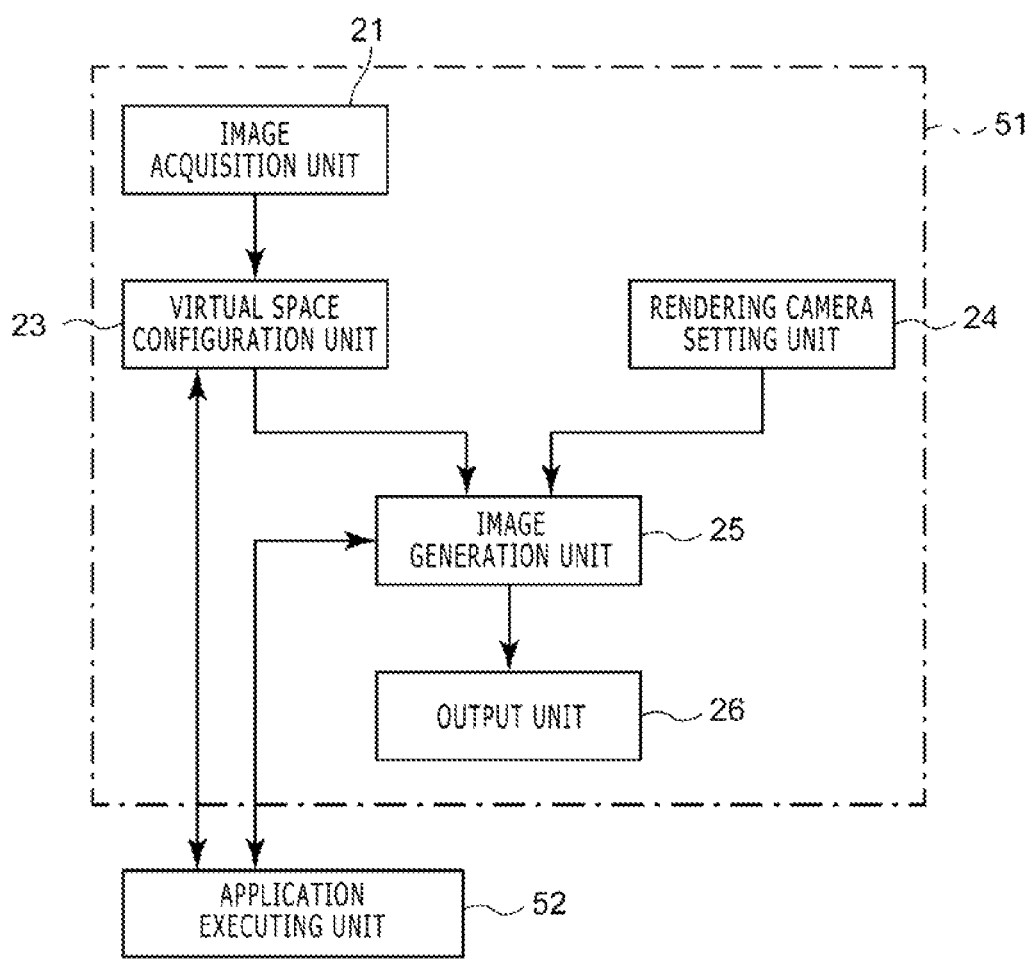
FIG. 2 is a functional block diagram illustrating an example of the image processing apparatus according to the embodiment of the present invention.

Next, an operation of the control unit 11 of the image processing apparatus 10 according to the embodiment of the present invention is described. The control unit 11 executes the program stored in the storage unit 12, and thereby, as illustrated in FIG. 2, includes an image processing unit 51 and an application executing unit 52 functionally. The image processing unit 51 includes an image acquisition unit 21, a virtual space configuration unit 23, a rendering camera setting unit 24, an image generation unit 25, and an output unit 26. The image processing unit 51 operates according to an instruction input from the application executing unit 52, and generates a pair of pieces of image data (image data for the left eye and image data for the right eye) obtained by rendering an image of the virtual space in a designated visual field as a stereovision image.

The image acquisition unit 21 acquires the information about the reality space around the user wearing the display apparatus 40. In particular, the information about the reality space obtained by the image acquisition unit 21 is the image data captured by the camera 43 of the display apparatus 40. In this example, the image acquisition unit 21 receives the image data captured by the camera 43 via the relay apparatus 30 from the display apparatus 40 as the information about the reality space. In one example of the present embodiment, the image data captured by the camera 43 is a pair of pieces of image data captured by the pair of imaging elements 430 disposed on the left and the right. Based on the disparity of each piece of the image data, a distance to an object in the reality space imaged can be decided. In the present embodiment, based on the image data captured by the camera 43, the image acquisition unit 21 generates and outputs a depth map having the same size (the same pixel array) as the image data (hereinafter, referred to as captured image data, for the purpose of distinction). Here, the depth map is image data in which information representing the distance to the object imaged in each pixel of the image data captured by the camera 43 is set as a pixel value corresponding to the pixel.

The virtual space configuration unit 23 generates environment mesh list information and a body buffer at first, based on the information about the depth map output by the image acquisition unit 21. Here, for example, the environment mesh list information is acquired as follows.

That is, the virtual space configuration unit 23 uses the depth map and the captured image data to perform segmentation processing for detecting objects in the reality space imaged in the captured image data for each object (for each object such as a desk, a wall, a floor, and a bookshelf). In addition, the virtual space configuration unit 23 sets an individual label (object identifier) for each region on the depth map occupied by each object.

The virtual space configuration unit 23 sets a mesh (polygon mesh) along an outer shape of the object in the region, with reference to the depth map in the region that is individually labeled. As well, when the user changes the position thereof or rotates the head portion thereof, the visual field of the camera 43 changes. Thereby, the shape of the object in the reality space may become apparent (for example, a portion that has been hidden by other object may be imaged). In this case, the mesh of the object is updated. As for this mesh setting method, since a widely known method can be employed, in which, for example, multi-view information is used, the detailed descriptions are omitted herein.

The virtual space configuration unit 23 generates the environment mesh list information. This environment mesh list information includes vertex coordinates of each set mesh (information representing a position of a pixel), identification information about the mesh, information about a normal line of the object imaged in a pixel in the captured image data correspondingly to a pixel in the mesh, type information about the mesh (information representing any of predefined types), information about the surface shape of the mesh, and an object identifier of the object corresponding to the mesh. Note that the vertex coordinates of the mesh may be a value in a world coordinate system (that is, an orthogonal coordinate system that is set in the reality space and includes a ξ axis and an η axis orthogonal to each other in the floor surface, and a ζ axis in a vertical direction). In addition, the object identifier may be included in the identification information about the mesh.

For example, a value in this world coordinate system is obtained by converting a value in the vertex coordinates and so on of the mesh acquired in the user coordinate system (XYZ coordinate system) based on the image data obtained in the reality space shot by the camera 43, using a model view matrix as coordinate conversion information.

The information about the mesh type is information generated based on the position of the object imaged in a pixel in the captured image data corresponding to a pixel in the mesh, and represents any of a floor, a ceiling, a wall, an obstruction (predefined as a body or the like other than walls within a predetermined height from the floor), and so on. In the present embodiment, the virtual space configuration unit 23 sets a plane on which a z axis component is the smallest (that is, it is located on the lowest position) as a floor, in the world coordinate system of the object (that is, the orthogonal coordinate system that is set in the reality space and includes the x axis and the y axis orthogonal to each other in the floor surface and the z axis in the vertical direction). In addition, a plane on which the z axis component is the greatest (that is, it is located on the highest position) is set as a ceiling. Moreover, a plane that is perpendicular to the floor and is located on the farthest position in the x axis and the y axis is set as a wall. The other objects are classified as obstructions.

In addition, the information about the surface shape of the mesh represents any of surface shapes such as a flat surface, a surface with recesses and protrusions, a spherical surface, and a surface with a complicated shape. This information can be defined based on, for example, the information about a normal line of each mesh representing an object.

In this manner, there are various methods for recognizing the object type, the surface shape, or the like in the captured image data based on the information of the depth map and so on. However, herein, it does not matter which method is employed.

The body buffer is a representation that indicates virtually the reality space (hereinafter, referred to as the target space) of a predetermined size around the user including the position of the user and the rear side with respect to the visual field direction of the user, with a voxel space (voxel: a virtual volume element, for example, a cubic element with 10 cm in width, 10 cm in depth, and 10 cm in height). For example, the predetermined size is a cuboid range with 10 m in width (a direction that is orthogonal to the initial visual field direction of the user and is parallel to the floor surface), 10 m in depth (the initial visual field direction of the user parallel to the floor surface), and 3 m in height. A value in a voxel (voxel value) in which a body exists is set as "1," a value in a voxel in which a body does not exist is set as "0," and a value in a voxel in which it is unclear whether a body exists or not is set as "−1" (FIG. 4).

Figures 4, 5:
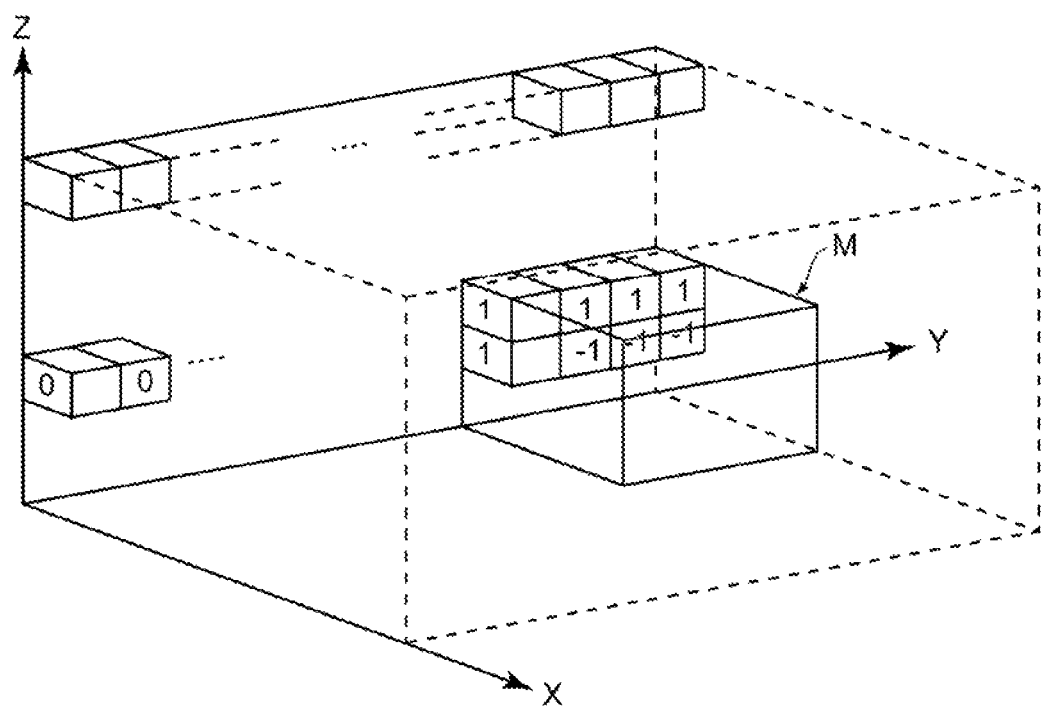
FIG. 4 is an illustration diagram illustrating an example of a body buffer generated by the image processing-apparatus according to the embodiment of the present invention.
FIG. 5 is an illustration diagram illustrating a projection image of the body buffer generated by the image processing apparatus according to the embodiment of the present invention.

For convenience of illustrating drawings, FIG. 4 illustrates only some of voxels in the target space. In addition, in FIG. 4, size of each voxel is also changed accordingly for the purpose of descriptions. The size of the voxels with respect to this target space does not necessarily indicate the appropriate size in implementation. Also, FIG. 4 illustrates the example in which a cubic body M is disposed at a corner of a depth side in the target space, a value in a voxel corresponding to the front faces of the body M is set as "1," representing that a body exists, a value in a voxel of each portion hidden from the front faces is set as "−1," representing that it is unclear whether a body exists or not, and a value in a voxel existing in a space up to the front faces of the body M is set as "0," representing that a body does not exist.

The virtual space configuration unit 23 sets these voxel values based on the information of the depth map. Each pixel on the depth map is obtained by dividing the base of a virtual square pyramid corresponding to the field angle of the depth map, with the resolution of the depth map (py pixels in height×px pixels in width), the virtual square pyramid having a vertex at the position coordinates of the camera 43 when capturing the image data that is original data of the depth map (the position coordinates may be the coordinates at the reference position; hereinafter, referred to as a position in image capturing). Here, there are a vector parallel to a line segment having a starting point at the coordinates at the position in image capturing and passing through a vertex of each pixel (coordinate difference in the world coordinate system), and a vector parallel to a line segment having a starting point at the coordinates at the position in image capturing and passing through the center of each pixel (coordinate difference in the world coordinate system). Such vectors can be calculated, as a direction of each pixel, based on the coordinates at the position in image capturing, information representing the field angle of the depth map, and the resolution of the depth map.

As for each pixel on the depth map, the virtual space configuration unit 23 sets, as "1," a value in a voxel which is located in the direction of the pixel with respect to the coordinates in the body buffer corresponding to the coordinates at the position in image capturing (the coordinates may be the coordinates at the reference position) and corresponds to the distance to the body represented by the depth map. The virtual space configuration unit 23 sets as "0," a value in a voxel that differs from the voxel of "1," and is located on a line extending from the voxel of "1" to the camera 43. In addition, on the image data captured by the camera 43, there may be a portion that is hidden by a body in the reality space and therefore is not imaged (that is, a portion on a back side of a desk or a wall, or a portion behind a body located on the floor). As for the hidden portion, the virtual space configuration unit 23 sets, as "−1," a value in a voxel in the corresponding portion, representing that it is unclear whether a body exists or not.

When the user moves or changes the direction of the head portion thereof, the viewpoint and the visual field direction are changed. At that time, the depth map of a portion may be obtained on the image data captured by the camera 43 directed from the viewpoint to the visual field direction, the portion having not been imaged and corresponding to the voxel in which it is unclear whether or not a body exists (the portion corresponding to the voxel whose value is set as "−1"). At that time, the virtual space configuration unit 23 sets the value in the voxel of the portion as "0" or "1," based on the obtained depth map, and updates the setting.

As for the method for setting the voxel value in the three-dimensional space that represents the range in which these bodies exist based on the information about depth map and so on, various methods such as a widely known method as a 3D scan method can also be employed, in addition to the method described herein.

Furthermore, based on a position and a visual field of a virtual rendering camera set in the target space by the after-mentioned rendering camera setting unit 24, the same visual field as that of the virtual rendering camera is set in the voxel space corresponding to the target space. The virtual space configuration unit 23 generates a two-dimensional projection image of the voxel in the visual field at that time.

Therefore, in this two-dimensional projection image of the voxel, similar to rendering processing, a virtual screen is disposed at a position being separated by a predefined distance in the visual field direction of the virtual rendering camera from the position of the virtual rendering camera, the screen being orthogonal to the visual field direction and having a size corresponding to the set field angle. On this screen, the pixel array of the same size as the image data included in the stereovision image generated by the image generation unit 25 is set, and each pixel in the pixel array is set as follows.

That is, while sequentially selecting pixels in this pixel array, the virtual space configuration unit 23 sets, as a pixel value of the selected pixel, a value in a voxel which is located at a position on an extension of a line extending from the position of the virtual rendering camera to a position of the selected pixel and which is the first voxel the extension meets which voxel has a value other than "0." If there is no voxel having a value other than "0," the virtual space configuration unit 23 sets the pixel value of the selected pixel, as "0."

Thereby, for example, the two-dimensional projection image as illustrated in FIG. 5 is obtained. The virtual space configuration unit 23 outputs this two-dimensional projection image to the application executing unit 52.

In addition, the virtual space configuration unit 23 generates the information about the virtual space in which a virtual object is disposed at the position in the virtual space corresponding to the position of the detected object in the reality space described above (a range of the mesh corresponding to the object) according to the instruction input from the after-mentioned application executing unit 52, thereby configuring the virtual space. Since the processing for disposing the virtual object represented by three-dimensional model data in the virtual space in this manner is widely known in the processing for creating three-dimensional graphics, the detailed descriptions herein are omitted.

As a particular example, the virtual space configuration unit 23 receives from the application executing unit 52 inputs of background image data, that is, a background image, information for identifying an object in the reality space (object identifier), three-dimensional model data of a body to be disposed at a position in the virtual space corresponding to a position of the object identified by the information, and data of a texture (material) to be applied to the surface of the body.

The virtual space configuration unit 23 disposes, for each of the input object identifiers, the virtual object represented by the three-dimensional model data input together with the object identifier in a range with which a mesh that represents an outer shape of the object represented by the object identifier is circumscribed, sets the texture (set in advance) corresponding to the information about the material input together with the object identifier, and generates information for specifying the virtual space.

The rendering camera setting unit 24 sets the position of the virtual rendering camera, the visual field direction (the direction of the rendering camera), and the field angle in performing the rendering. In the present embodiment, the rendering camera setting unit 24 obtains the information representing the predefined position of the rendering camera (for example, it may be hard-coded in a program, or may be read out from a setting file) regardless of, for example, positions of the imaging elements 430 included in the camera 43, and the information representing the visual field direction (for example, information about a vector in which the position of the rendering camera is set as a starting point and which passes through the center of the visual field). The rendering camera setting unit 24 sets the above information as visual field information.

In addition, as another example, the rendering camera setting unit 24 may obtain the position of the rendering camera in the virtual space, as relative coordinates with respect to the reference position in the reality space that varies in time with movement of the user. As one example, the position in the virtual space corresponding to the position moved by the predefined relative coordinate value from the aforementioned reference position may be set as the position of the rendering camera.

The relative coordinates herein may be, for example, relative coordinates from the reference position to the position of the imaging element 430R or 430L. In addition, the relative coordinates may be relative coordinates from the reference position to the position at which the right eye (or the left eye) of the user wearing the display apparatus 40 is supposed to be located. In this case, the position in the virtual space corresponding to the position of the right eye (or the left eye) of the user is set as the position of the rendering camera.

Figure 3:
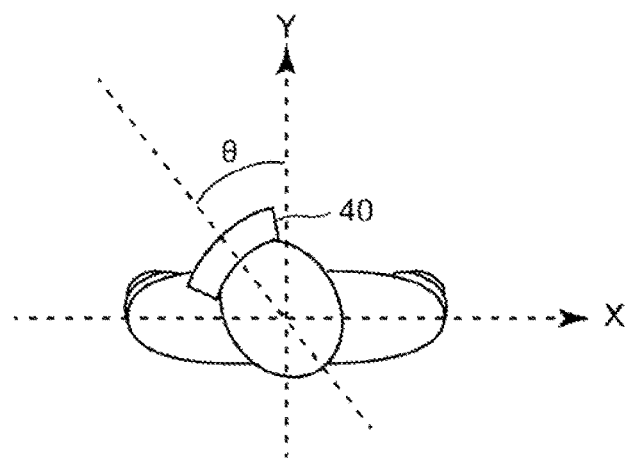
FIG. 3 is an illustration diagram illustrating an example of information about inclination of a head portion used by the image processing apparatus according to the embodiment of the present invention.
Figure 3:
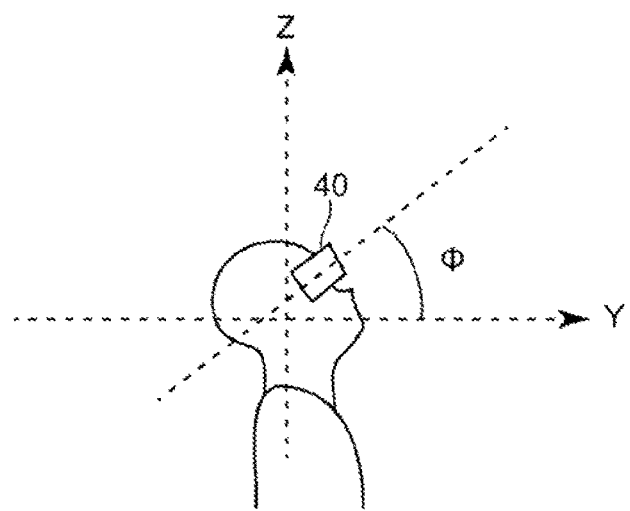
Figure 3:
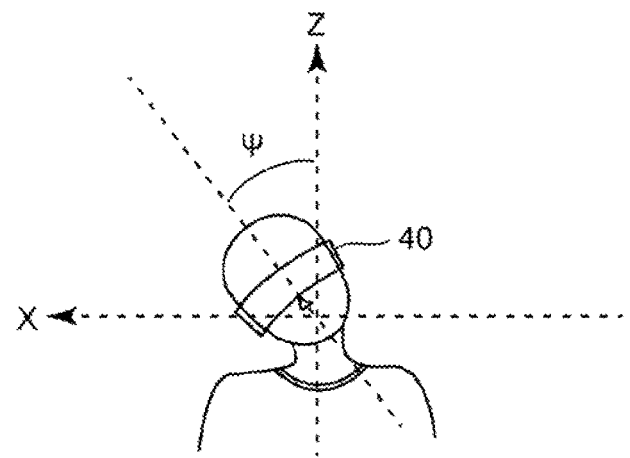

In particular, the rendering camera setting unit 24 acquires information representing the position (reference position) and the direction of the head portion of the user wearing the display apparatus 40, from the head direction sensor 441 in the display apparatus 40. That is, the rendering camera setting unit 24 acquires a rotation angle θ in the head direction within a plane parallel to the floor surface, a rotation angle φ in an elevation angle direction and a rotation angle ψ around an axis in the visual field direction with respect to the initial direction when the user wears the display apparatus 40, which angles are illustrated in FIG. 3, and movement amount (x, y, z) of the head portion.

The rendering camera setting unit 24 obtains the coordinates in the virtual space corresponding to the reference position, based on information about the movement amount of the head portion. With the world coordinates in the reality space being matched with the coordinates in the virtual space, the coordinate value in the reality space may be used as it is as the coordinate value in the virtual space. The rendering camera setting unit 24 adds the relative coordinates (set in advance) from the reference position to the position of the right eye of the user to the coordinate value of the reference position to determine the position of the rendering camera corresponding to the right eye, and sets the direction of the head portion of the user as the visual field direction.

In addition, the rendering camera setting unit 24 adds the relative coordinates (set in advance) from the reference position to the position of the left eye of the user to the coordinate value of the reference position to determine the position of the rendering camera corresponding to the left eye, and sets the direction of the head portion of the user as the visual field direction. Note that the field angle is set in advance.

The image generation unit 25 uses the information about the positions and the visual field directions of the rendering cameras individually corresponding to the left eye and the right eye set by the rendering camera setting unit 24, and the field angle, to render a stereovision image (image data for each of the left and right eyes) of the virtual object disposed in the virtual space with reference to the information generated by the virtual space configuration unit 23 for specifying the virtual space. The image generation unit 25 outputs the pair of pieces of image data obtained by the rendering as a stereovision image to the output unit 26. Since this rendering method is widely known, the detailed descriptions herein are omitted.

The output unit 26 outputs the stereovision image input from the image generation unit 25 to the display apparatus 40 via the relay apparatus 30.

The application executing unit 52 executes, for example, a program of a game. In the example of the present embodiment, the application executing unit 52 receives an input of the information about the two-dimensional projection image of the voxel and an input of the environment mesh list information, from the image processing unit 51.

In addition, the application executing unit 52 determines the three-dimensional model data of the virtual object disposed in the virtual space according to the processing of the game. As a particular example, this determination method is described as follows. That is, in the case where the value in the voxel is "1," following determinations are performed considering the mesh of the corresponding portion:
(1) If the type of the mesh is a "ceiling," a background is synthesized.
(2) If the type of the mesh is an obstruction and the surface of the mesh is flat, the body is set as an "operation panel."
(3) If the type of the mesh is an obstruction and the surface of the mesh includes recesses and protrusions, the body is set as a "rock" or a "box."
(4) If the type of the mesh is an obstruction and the surface of the mesh is spherical, the body is set as a "light."
(5) If the type of the mesh is an obstruction and the surface of the mesh is in a complicated shape, the body is set as "tree or plant."

Figure 6:
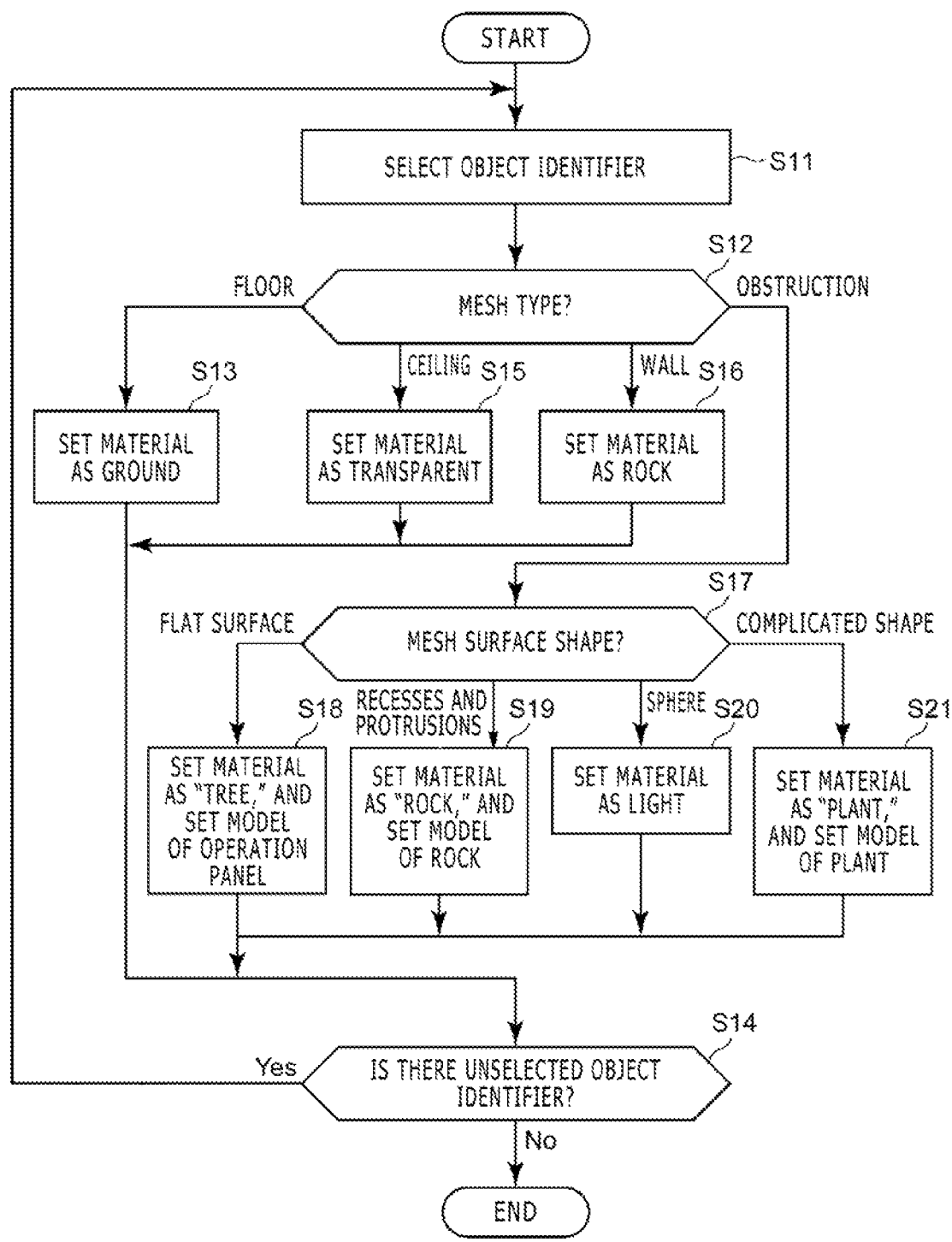
FIG. 6 is a flowchart illustrating an operational example of the image processing apparatus according to the embodiment of the present invention.

With reference to FIG. 6, an operation of the application executing unit 52 based on this example is described. As illustrated in FIG. 6, the application executing unit 52 refers to the input environment mesh list information, and selects one of unselected object identifiers (S11).

The application, executing unit 52 to the information about the mesh type of the selected object identifier (S12) and, if the mesh type is the "floor," relates the setting in which the material is set as ground to the selected object identifier (S13). The application executing unit 52 then decides whether there is another unselected object identifier or not (S14). If there is another unselected object identifier, the processing returns to the process S11 and continues.

At the process S12, if the mesh type is the "ceiling," the application executing unit 52 relates the setting in which the material is set as "transparent" to the selected object identifier (S15; therefore, the background image is displayed on that portion), and then the processing proceeds to the process S14.

At the process S12, if the mesh type is the "wall," the application executing unit 52 relates, to the selected object identifier, the setting in which the material is set as "rock" and the "rock" data is to be used as the three-dimensional model data of the body (S16), and the processing proceeds to the process S14. Further, at the process S12, if the mesh type is the "obstruction," the application executing unit 52 refers to the information about the surface shape of the mesh (S17). If the surface shape is the "flat surface," the application executing unit 52 relates, to the selected object identifier, the setting in which the material is set as "tree" and the "operation panel" is to be used as the three-dimensional model data of the body (S18), and the processing proceeds to the process S14.

At the process S17, if the surface shape is the "surface with recesses and protrusions," the application executing unit 52 relates, to the selected object identifier, the setting in which the material is set as "rock" and the "rock" data is to be used as the three-dimensional model data of the body (S19), and the processing proceeds to the process S14. At the process S17, if the surface shape is "spherical," the application executing unit 52 relates the setting in which the material is set as "light" to the selected object identifier (S20), and the processing proceeds to the process S14.

At the process S17, if the surface shape is the "complicated shape," the application executing unit 52 relates, to the selected object identifier, the setting in which the material is set as "plant" and the "plant" is to be used as the three-dimensional model data of the body (S21), and the processing proceeds to the process S14.

At the process S14, if there is no unselected object identifier, the application executing unit 52 ends the processing.

As a result, based on the setting for the three-dimensional model data and the material for each of the obtained object identifiers, the virtual space configuration unit 23 configures the virtual space.

Note that the processing herein is mere one example. Depending on game contents, based on the image in which the reality space is captured, the virtual object having the same shape and same surface texture as those of the body in the reality space may be disposed at the position in the virtual space corresponding to the position of the body in the reality space. In this example, the image of the reality space in which the user exists is reconfigured as the virtual space in the game. Each of the images in the visual fields of the pair of virtual cameras disposed in the three-dimensional space correspondingly to the eyes of the user (that is, the pair of virtual cameras disposed at the positions corresponding to the left and right eyes of the user and oriented in the visual field directions of the user) is rendered, and is displayed on the display apparatus 40.

The application executing unit 52 may also refer to the two-dimensional projection image of the input voxel and dispose the virtual object providing a predefined type of visual effect in a region that is set as "−1" in the projection image, that is, at the position in the virtual space corresponding to the position at which no object is detected in the reality space. In particular, the application executing unit 52 may output to the image processing unit 51 the instruction for displaying a designated vision effect or image as a process in the game, together with the information for identifying the region set as "−1" in the two-dimensional projection image of the voxel (the information may be the information for identifying the pixel in the region).

Here, the vision effect includes, for example, an effect in which a vision of smoke or the like is displayed and an effect in which a light blinks. In addition, the image to be displayed may be an image of "?" or the like, or an image representing a caution and an alarm.

When the image processing unit 51 receives this instruction, it synthesizes the designated vision effect or the designated image on the pixel in the designated range and output them.

(Operation)

Figure 7:
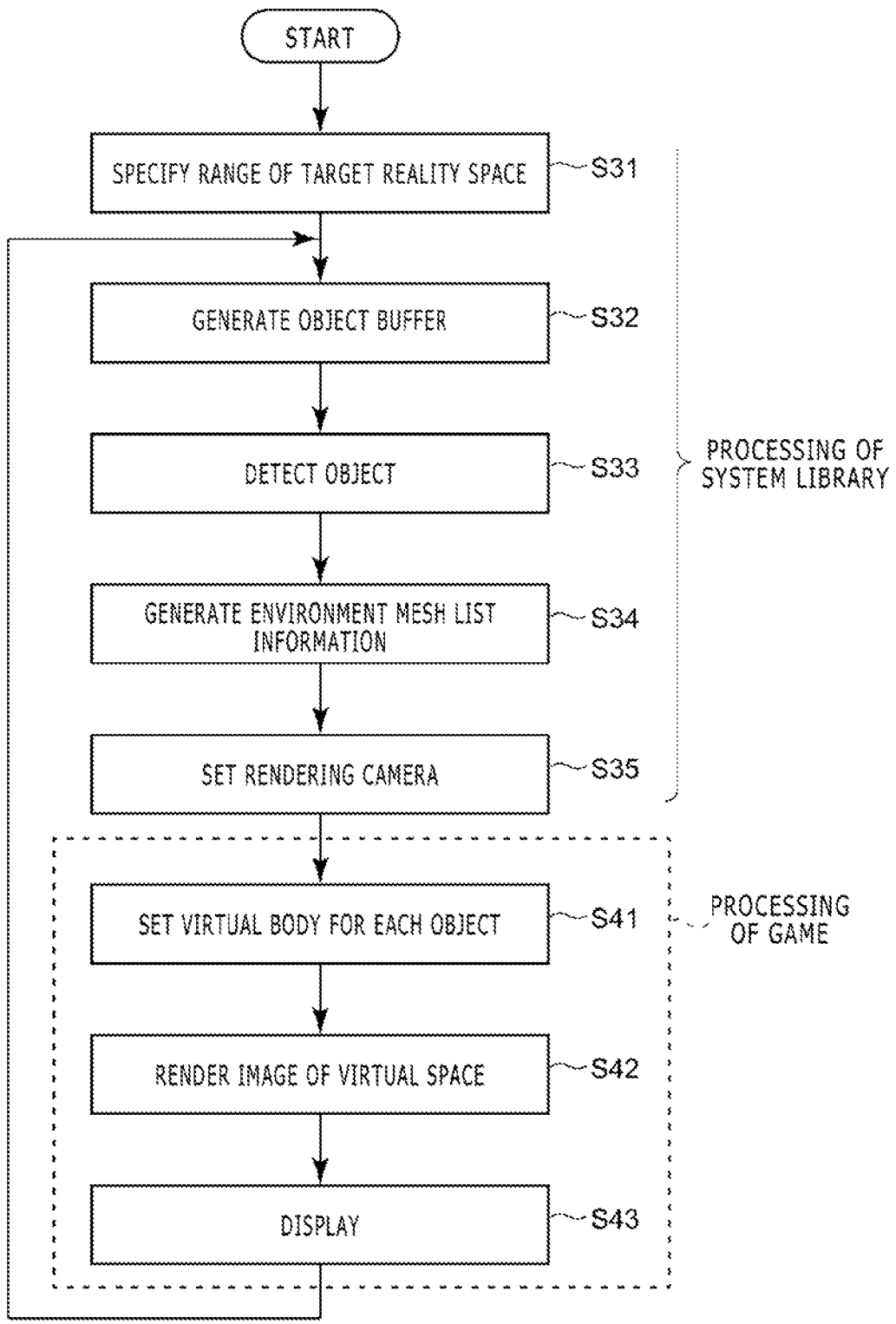
FIG. 7 is a flowchart illustrating an operational example of the image processing apparatus according to the embodiment of the present invention.

In the embodiment of the present invention, the image processing apparatus 10 includes the above configurations basically, and operates as follows. When the user wears the display apparatus 40 at the head portion thereof, the image processing apparatus 10 starts the processing illustrated in FIG. 7, and sets a world coordinate system.

The image processing apparatus 10 sets, as the target space, the reality space in a cuboid range having the original point at the predetermined position of the display apparatus 40 (for example, the gravity center position of each of the imaging elements 430 of the camera 43) with ±5 m (total 10 m) in the X axis direction and ±5 m (total 10 m) in the Y axis direction centered at the user including the rear side with respect to the initial eye direction of the user, and 3 m in height from the floor in the Z axis direction (S31).

The image processing apparatus 10 sets a body buffer obtained by virtually representing this target space as a voxel space (voxel: a virtual volume element, for example, a cubic element with 10 cm in width, 10 cm in depth, and 10 cm in height). In the body buffer, all voxel values are initially set as "−1." The image processing apparatus 10 then stores the body buffer in the storage unit 12 (S32).

The display apparatus 40 repeatedly captures an image by the camera 43 in every predetermined timing (for example, every 1/1000 second), and sends the captured image data obtained by the capturing to the image processing apparatus 10. The image processing apparatus 10 receives the captured image data via the relay apparatus 30 from the display apparatus 40. In addition, the image processing apparatus 10 generates, based on this captured image data, a depth map obtained from the image data.

The image processing apparatus 10 uses the generated depth map to detect an object (a ceiling, a floor, a wall, a piece of furniture and so on) in the reality space (S33). In addition, the image processing apparatus 10 decides the type and the surface shape of the mesh (polygon mesh) representing the shape of the detected object. The image processing apparatus 10 then relates the information representing the position of the generated mesh (the information may be vertex coordinates of the mesh), the information about the mesh type and the information about the surface shape to one another, and stores those pieces of information in the storage unit 12 as the environment mesh list information (S34: Generate environment mesh list information).

The image processing apparatus 10 detects a movement of the head portion of the user and the direction of the head portion, with the sensor unit 44, and sets the position and the visual field of the rendering camera based on the detected information about the movement and the direction of the head portion (S35).

The image processing apparatus 10 further obtains, while sequentially selecting the pixels in the depth map, the position coordinates of the reference position in the world coordinate system based on the movement of the head portion of the user detected by the sensor unit 44. The image processing apparatus 10 sets, as "1," a value in a voxel corresponding to the distance from the coordinates in the body buffer corresponding to the position corresponding to the obtained position coordinates to the body represented by the pixel selected in the depth map. The image processing apparatus 10 sets, as "0," a value in a voxel that differs from the voxel of "1" and is located on a line extending from the voxel of "1" to the camera 43. In the image data captured by the camera 43, there may be a portion that is hidden by a body in the reality space and therefore is not imaged. As for the hidden portion, the image processing apparatus 10 keeps a value in the voxel of the corresponding portion unchanged as "−1," representing that it is unclear whether a body exists or not.

When the user moves or changes the direction of the head portion thereof, the depth map of a portion corresponding to the voxel that is not imaged previously and in which it is unclear whether a body exists or not (the portion corresponding to the voxel whose value: is "−1") may be obtained the image data captured by the camera 43. At that time, at the process S11, the image processing apparatus 10 updates the value in the voxel of the portion by setting the value as "0" or "1" based on the obtained depth map.

The image processing apparatus 10 generates a projection image obtained by two-dimensionally projecting the voxel located in the visual field direction of the camera 43 in the body buffer from the position coordinates of the rendering camera (FIG. 5).

The image processing apparatus 10 also performs the following processing with reference to the environment mesh list information and the information about the two-dimensional projection image of the voxel, as processing of the game.

That is, the image processing apparatus 10 disposes the corresponding virtual object in the region within the virtual space corresponding to the reality space in which the object exists, with reference to the environment mesh list information, for each detected object, based on the information about the type and the surface shape of the mesh, and configures the virtual space (S41). Note that, as for the background image used for the configuration of the virtual space, the three-dimensional model data of the virtual object and so on, data prepared as game data by a game provider may be used.

As one example, in a case where the user who wears the display apparatus 40 exists in a room in which a desk, a bookshelf, a television stand, a television and the like are placed on a flat floor surface and which is surrounded by walls on all four sides thereof, a top board of the desk is decided as the mesh of an obstruction with flat surface shape. The image processing apparatus 10 then performs a setting in which, for example, the virtual object of "operation panel" is disposed at the position of this top board. As for the wall, the image processing apparatus 10 performs a setting in which a virtual rock is disposed so that the surface of the virtual object viewed as the "rock" is located at the position of the wall surface. Further, the image processing apparatus 10 sets the range corresponding to the ceiling as a transparent material so as to synthesize a background image, and configures the virtual space as if there is no ceiling.

The image processing apparatus 10 then creates the virtual stereovision image by rendering processing such that, in the configured virtual space, the range of the set visual field is viewed from the position of the rendering camera set in the process S35 (S42). At that time, based on the projection image obtained by two-dimensionally projecting the voxel of the body buffer, the image processing apparatus 10 may set a predetermined vision effect such as an effect of making smoke for a portion at which it is unclear whether a body exists or not. The image processing apparatus 10 sends thus generated stereovision image data to the display apparatus 40, and causes the display apparatus 40 to display the stereovision image (S43).

When the user moves or the head portion thereof moves, the position and the visual field direction of the camera 43 are changed. At that time, based on the image captured newly in the captured image data, the information about the voxel space and the environment mesh list information are updated. In addition, in a case where the position and the visual field of the rendering camera are set based on the position and the direction of the head portion of the user, the position and visual field of the rendering camera are also updated. The image processing apparatus 10 refers to this updated information to perform the rendering processing, and updates the stereovision image data to display it.

Furthermore, the image processing apparatus 10 executes, when the user touches the virtual operation panel located at the position in the virtual space corresponding to the top board of the desk, processing for receiving the operation on the operation panel, as processing of the game. At that time, the user touches the top board of the desk in the reality space if the user reaches out its hand for the position of the operation panel in the virtual space. Therefore, the user can also get a tactile feedback. In addition, the user may not attempt to move to a range in which there is the top board of the desk (since the operation panel is displayed, the user does not move so as to push the operation panel away). In such a manner, it is possible for the user to naturally perceive the position of an obstruction existing around the user in the processing of the game.

(Object Out of Reach of the Hand)

It is described herein that the image processing apparatus 10 performs the processing for displaying the virtual object corresponding to the object in the target space, regardless or the distance from the user. However, the present embodiment is not limited to this case. The image processing apparatus 10 may detect the position of the object within a predetermined distance from the user (for example, a value in the Z axis (a distance from the camera) is used in the user coordinate system), and may configure the information about the virtual space by disposing the virtual object at the position in the virtual space corresponding to the position of the detected object.

In particular, in this example, as illustrated in FIG. 8, the image processing apparatus 10 selects one of the unselected object identifiers (S51) in the processing of the game or the like, and obtains the distance to the mesh corresponding to the selected object identifier (the distance to one vertex of the corresponding mesh whose coordinates are the closest to the position of the rendering camera among the vertices) (S52).

The image processing apparatus 10 decides whether the obtained distance exceeds a predefined first threshold value or not (S53). If the obtained distance exceeds the first threshold value (in the case of Yes), the image processing apparatus 10 performs the setting in which the virtual object corresponding to the mesh is not displayed and decides whether there is another unselected object identifier or not (S54). If there is another unselected object identifier, the processing returns to the process S51 and continues.

On the other hand, at the process SS3, if the distance obtained at the process S52 does not exceed the first threshold value (in the case of No), the image processing apparatus 10 executes the processing from the process S12 to the process S21 in the processing illustrated in FIG. 6, and determines the material and the three-dimensional model data of the corresponding virtual object for each object identifier (S55). Note that, after the process S14 in the processing of FIG. 6, the next process S56 is performed.

Next, the image processing apparatus 10 decides whether or not the distance obtained at the process S52 exceeds a predefined second threshold value (a value smaller than the first threshold value) (S56). If the image processing apparatus 10 decides that the above distance exceeds the second threshold value (in the case of Yes), it refers to the information about the type of the mesh corresponding to the selected object identifier, and decides whether the type information indicates the "obstruction" or not (S57).

If the mesh type is not the "obstruction" (that is, the type is the ceiling, the floor, or the wall), the processing in the image processing apparatus 10 proceeds to the process S54. In addition, if the mesh type is the "obstruction," the image processing apparatus 10 may perform a setting in which the position of the virtual object corresponding to the selected object identifier moves as time passes, according to the processing of the game (S58).

For example, the image processing apparatus 10 may set the second threshold value as a value representing a limitation of the range within which the user's hand can reach, and set the virtual object located at a position at which the distance exceeds the second threshold value as a robot that moves around outside the range within which the user's hand can reach. In addition, this movable range may be defined based on the difference between the distance obtained in the process S52 and the second threshold value.

In particular, the image processing apparatus 10 may perform control such that, as the difference decreases, the movable range is set to a range within which the virtual object is closer to the proper position in the virtual space. This proper position is, for example, a position in the virtual space corresponding to the position of the object in the reality space corresponding to the virtual object. Therefore, in this example, the image processing apparatus 10 performs a control such that, if the virtual object moves to a position to which the user's hand can reach, the virtual object returns to the position in the virtual space corresponding to the position of the object in the reality space corresponding to the virtual object. Thereafter, the processing in the image processing apparatus 10 proceeds to the process S54 and continues.

In addition, at the process S56, if the distance obtained at the process S52 does not exceed the predefined second threshold value, the processing in the image processing apparatus 10 proceeds to the process S54. Thereby, as for the object located at the position at which the distance does not exceed the second threshold value, the virtual object having the material corresponding to the object is disposed at the position in the virtual space corresponding to the position of the object.

In this example of the present embodiment, the object within the reach of the user's hand in the reality space is reflected as a virtual object in the virtual space. On the other hand, as for the object outside the reach of the user's hand in the reality space, the display with high degree of freedom is performed by, for example, moving the object or not displaying the object as a virtual object. In addition, even in the case where the virtual object is moved, depending on the distance in the reality space between the user and the object in the reality space corresponding to the virtual object, the image processing apparatus 10 controls the range in which the virtual object can move (that is, the movable range). Thereby, control is performed such that, when the user comes near the object, the virtual object returns to the original position.

(Object that Moves in the Reality Space)

In addition, the image processing apparatus 10 in the present embodiment may detect only the object existing at the same position continuously at least predetermined number of times (more than once) in the captured image data, as the object in the reality space. For example, even if the user's hand and so on is included in the captured image data, the image processing apparatus 10 does not detect the hand as the object in the reality space because the hand moves naturally. Similarly, it does not detect other people passing in front of the eyes of the user, as the object in the reality space.

(Step)

When the image processing apparatus 10 in the present embodiment detects that the mesh whose type is decided as the "floor" includes a step, it may perform processing for displaying information such as "Caution!" at the position in the virtual space corresponding to the position of the step.

(Switching To and From the Camera See-through Display)

In addition, upon receiving an instruction from the user, the image processing apparatus 10 in the present embodiment may generate a stereovision image of the reality space based on the captured image data of the reality space captured by the camera 43 and output the stereovision image (so-called, camera see-through display) instead of the stereovision image obtained by rendering the virtual object and so on in the virtual space.

For example, the image processing apparatus 10 in line present embodiment may suspend the processing of the game and switch to the camera see-through display when the user pushes the pause button for instructing a temporary stop of the game on the operation device 20.

In this case, when a restart of the game is instructed (for example, when the user pushes the pause button on the operation device 20 again), the image processing apparatus 10 may restart the processing for displaying the stereovision image in the virtual space and restart the processing of the game.

Furthermore, the image processing apparatus 10 may switch to the camera see-through display without a clear instruction by the user when the game ends such as the case of a game-over.

In this switching, the image processing apparatus 10 may instantaneously switch between the stereovision image of the virtual space and the stereovision image based on the captured image data, or may perform processing for generating and displaying a known vision of screen switching such as cross fading.

(The Processing in the Case Where There is No Surface Necessary in the Processing of the Game)

In the present embodiment, for convenience of processing of the game and so on, if there is no mesh having the type and the surface shape corresponding to the three-dimensional model of the virtual object that should be disposed, the image processing apparatus 10 may notify the user to that effect.

In this example, particularly, the image processing apparatus 10 relates the three-dimensional model data of the virtual object to information (essentiality information) representing whether it is the three-dimensional model data of the virtual object that must be disposed in the virtual space or the three-dimensional model data of the virtual object that may be disposed (optionally disposed) in the virtual space.

After the processing in FIG. 6 (or the processing in FIG. 8 corresponding to the processing in FIG. 6) is completed, the image processing apparatus 10 checks whether or not all of the three-dimensional model data of the virtual objects that must be disposed in the virtual space based on the essentiality information are related to any of the object identifiers. If there is three-dimensional model data of a virtual object that is not related to any of the object identifiers and that must be disposed in the virtual space, the image processing apparatus 10 may generate an image for notifying the user to that effect and send the image to the display apparatus 40.

(Variations)

In the above examples, the position of the rendering camera is set at, for example, the actual position of each of the eyes of the user. In this case, by correcting a distance sense from the eyes of the user to the hand thereof in the virtual space, an uncomfortable feeling reduces.

Furthermore, in the above descriptions in the present embodiment, the captured image data is obtained by the camera 43. However, the present embodiment is not limited to this. As another example of the present embodiment, an image data captured by a camera disposed in a room where the user exists may be used.

Moreover, in the present embodiment, as long as information about the object in the reality space can be obtained, any methods may be employed. For example, the object in the target space of the reality space may be three-dimensionally scanned in advance before the processing of the game starts. Alternatively, the outer shape of the object in the target space may be recognized by emitting a predetermined pattern of infrared light and recognizing the pattern.

(Another Example for Acquiring the Information about the Position and the Inclination of the Head Portion of the User)

In the above descriptions, the information about the position and the inclination of the head portion of the user is obtained from the head direction sensor 441 provided in the display apparatus 40. However, the present embodiment is not limited to this. For example, the position and the inclination angle of the head portion of the user may be detected by imaging the user by a camera disposed at a known position in a room where the user exists and detecting the position and the posture of a predetermined point moving together with the head portion of the user, for example, a predetermined marker disposed in advance on the display apparatus 40 worn by the user. Since the technology is widely known which detects the position and the inclination of a marker based on the marker and image data in which the marker is captured in this manner, the detailed descriptions are omitted herein.

In this method, when acquiring the information about the position and the inclination of the head portion of the user, it is not always necessary to provide the head direction sensor 441 in the display apparatus 40.

(Effects of the Embodiment)

According to the embodiment of the present invention, it is possible to display an image of the virtual space to the user, without causing an uncomfortable feeling in relation to the reality space.

10 Image processing apparatus
11 Control unit
12 Storage unit
13 Interface unit
20 Operation device
21 Image acquisition unit
23 Virtual space configuration unit
24 Rendering camera setting unit
25 Image generation unit
26 Output unit
30 Relay apparatus
40 Display apparatus 41 Vision display element
42 Optical element
43 Camera
44 Sensor unit
45 Communication interface
51 Image processing unit
52 Application executing unit
430 Imaging element
441 Head direction sensor

The invention claimed is:

1. An image processing apparatus connected with a display apparatus used by a user wearing the apparatus at a head portion thereof, comprising:
information acquisition means for acquiring information on a reality space around the user;
virtual space configuration means for detecting positions of objects in the reality space based on the acquired information on the reality space,
wherein the objects include a floor, a ceiling, walls, and obstruction objects,
and configuring information on a virtual space by disposing a virtual body at a position in the virtual space corresponding to the detected position of each of the objects
wherein a first object type is disposed at a position of the floor,
wherein a second object type is disposed at a position of each wall, and
wherein, for each obstruction object, an object type is selected matching a mesh surface shape or a concavity of the obstruction object;
image generation means for generating an image of the virtual space configured by the virtual space configuration means; and
output means for outputting the image generated by the image generation means to the display apparatus,
wherein the image processing apparatus is non-transmissive.

2. The image processing apparatus according to claim 1, wherein the virtual space configuration means determines, based on information on the position of each of the objects in the reality space, the virtual body to be disposed at the position in the virtual space corresponding to the position of the object.

3. The image processing apparatus according to claim 1, wherein
the information on the reality space acquired by the information acquisition means is image information obtained by imaging the reality space, and
the image processing apparatus selects whether, based on an instruction from the user, the output means outputs an image based on the acquired image information on the reality space to the display apparatus or outputs the image of the virtual space generated by the image generation means to the display apparatus.

4. The image processing apparatus according to claim 1, wherein the virtual space configuration means configures the virtual space by disposing a virtual object providing a predefined type of visual effect at a position in the virtual space corresponding to a position at which no object is detected in the reality space.

5. The image processing apparatus according to claim 1, wherein the virtual space configuration means detects, among the objects in the reality space, a position of an object existing within a predetermined distance from the user, and configures the information on the virtual space by disposing a virtual body at a position in the virtual space corresponding to the detected position of the object.

6. The image processing apparatus according to claim 1, wherein the second object type has a rock texture.

7. The image processing apparatus according to claim 1, wherein a light is selected for spherical obstruction objects.

8. The image processing apparatus according to claim 1, wherein a light is selected for spherical obstruction objects.

9. The image processing apparatus according to claim 1, wherein a tree is selected for obstruction objects having a flat surface greater than a predetermined size.

10. A non-transitory computer readable medium having stored thereon a program for an image processing apparatus connected with a display apparatus used by a user wearing the apparatus at a head portion thereof, the program comprising:
information acquisition means for acquiring information on a reality space around the user;
virtual space configuration means for detecting positions of objects in the reality space based on the acquired information on the reality space,
wherein the objects include a floor, a ceiling, walls, and obstruction objects,
and configuring information on a virtual space by disposing a virtual body at a position in the virtual space corresponding to the detected position of each of the objects,
wherein a first object type is disposed at a position of the floor,
wherein a second object type is disposed at a position of each wall, and
wherein, for each obstruction object, an object type is selected matching a mesh surface shape or a concavity of the obstruction object;
image generation means for generating an image of the virtual space configured by the virtual space configuration means; and
output means for outputting the image generated by the image generation means to the display apparatus.

* * * * *